United States Patent
Dey

(10) Patent No.: US 12,174,813 B1
(45) Date of Patent: Dec. 24, 2024

(54) SYSTEMS AND METHODS FOR FORWARD AND BACKWARD LOOKUP OF RELATED VARIABLES

(71) Applicant: JPMORGAN CHASE BANK, N.A., New York, NY (US)

(72) Inventor: Soumen Dey, Dorset (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 21 days.

(21) Appl. No.: 18/326,330

(22) Filed: May 31, 2023

(51) Int. Cl.
   *G06F 16/22* (2019.01)
(52) U.S. Cl.
   CPC ...... *G06F 16/2237* (2019.01); *G06F 16/2264* (2019.01)
(58) Field of Classification Search
   CPC .......................... G06F 16/2237; G06F 16/2264
   USPC .......................................................... 707/696
   See application file for complete search history.

(56) References Cited

U.S. PATENT DOCUMENTS

| | | | |
|---|---|---|---|
| 11,435,941 B1 * | 9/2022 | Xu | G06N 5/04 |
| 2019/0004998 A1 * | 1/2019 | Gomez | G06F 16/2237 |
| 2022/0365920 A1 * | 11/2022 | Furusho | G06F 16/9535 |
| 2023/0222124 A1 * | 7/2023 | Sun | G06F 16/2264 |
| | | | 707/714 |

* cited by examiner

*Primary Examiner* — Hicham Skhoun
(74) *Attorney, Agent, or Firm* — GREENBERG TRAURIG LLP

(57) ABSTRACT

In some aspects, the techniques described herein relate to a method including: providing a plurality of arrays, wherein each array of the plurality of arrays is related to a first array; receiving, by a lookup operation, a variable value, wherein the variable value is stored in the first array; determining a first index value of an array element of the first array, wherein the array element of the first array stores the variable value; determining, based on the first index value of the array element of the first array, a respective index value for each array in the plurality of arrays; returning, to a caller of the lookup operation, a respective value stored at a corresponding array element of each respective index value for each array in the plurality of arrays.

20 Claims, 3 Drawing Sheets

100

|  0  |  1  |
|-----|-----|
| U1  | U2  |

1-dimensional Array 111

|   | 0   | 1   | 2   |
|---|-----|-----|-----|
| 0 | 2T1 | 2T3 | 2T5 |
| 1 | 2T2 | 2T4 |     |

2-dimensional Array 112

|   | 0 | 1 | 2 | 3 | 0 | 1 | 2 | 3 | 0 | 1 | 2 | 3 |
|---|---|---|---|---|---|---|---|---|---|---|---|---|
| 0 | C1 | C2 | C3 |   | C4 | C5 | C6 | C7 | C8 | C9 | C10 |   |
| 1 | C11 | C12 |   |   | C13 | C14 | C15 |   |   |   |   |   |

3-dimensional Array 113

Memory 102

FIGURE 1

SYSTEMS AND METHODS FOR FORWARD AND BACKWARD LOOKUP OF RELATED VARIABLES

BACKGROUND

1. Field of the Invention

Aspects generally relate to systems and methods for forward and backward lookup of related variables.

2. Description of the Related Art

Scenarios in computer science fields (e.g., application development) may require the ability to select a first variable and have other variables populate based on the selection of the first variable. Due to finite storage and processing resources, operations should consider time complexity and space complexity. Accordingly, where more than a small number of variables are available for lookup, a brute force method will not be efficient.

SUMMARY

In some aspects, the techniques described herein relate to a method including: providing a plurality of arrays, wherein each array of the plurality of arrays is related to a first array; receiving, by a lookup operation, a variable value, wherein the variable value is stored in the first array; determining a first index value of an array element of the first array, wherein the array element of the first array stores the variable value; determining, based on the first index value of the array element of the first array, a respective index value for each array in the plurality of arrays; and returning, to a caller of the lookup operation, a respective value stored at a corresponding array element of each respective index value for each array in the plurality of arrays.

In some aspects, the techniques described herein relate to a method, wherein each array in the plurality of arrays has a different number of dimensions.

In some aspects, the techniques described herein relate to a method, including: determining a number of dimensions of the first array where the variable value is stored.

In some aspects, the techniques described herein relate to a method, including: performing, for each array in the plurality of arrays that has fewer dimensions than the number of dimensions of the first array, a backwards lookup based on the first index value of the array element of the first array.

In some aspects, the techniques described herein relate to a method, wherein the backwards lookup returns, to the caller of the lookup operation, a single value from each array in the plurality of arrays that has fewer dimensions than the number of dimensions of the first array.

In some aspects, the techniques described herein relate to a method, including: performing, for each array in the plurality of arrays that has more dimensions than the number of dimensions of the first array, a forward lookup based on the first index value of the array element of the first array.

In some aspects, the techniques described herein relate to a method, wherein the forward lookup returns, to the caller of the lookup operation, values from a plurality of array elements from each array in the plurality of arrays that has more dimensions than the number of dimensions of the first array.

In some aspects, the techniques described herein relate to a system including at least one computer including a processor and a memory, wherein the at least one computer is configured to: provide a plurality of arrays in the memory, wherein each array of the plurality of arrays is related to a first array; receive, by a lookup operation, a variable value, wherein the variable value is stored in the first array; determine a first index value of an array element of the first array, wherein the array element of the first array stores the variable value; determine, based on the first index value of the array element of the first array, a respective index value for each array in the plurality of arrays; and return, to a caller of the lookup operation, a respective value stored at a corresponding array element of each respective index value for each array in the plurality of arrays.

In some aspects, the techniques described herein relate to a system, wherein each array in the plurality of arrays has a different number of dimensions.

In some aspects, the techniques described herein relate to a system, wherein the at least one computer is configured to: determine a number of dimensions of the first array where the variable value is stored.

In some aspects, the techniques described herein relate to a system, wherein the at least one computer is configured to: perform, for each array in the plurality of arrays that has fewer dimensions than the number of dimensions of the first array, a backwards lookup based on the first index value of the array element of the first array.

In some aspects, the techniques described herein relate to a system, wherein the backwards lookup returns, to the caller of the lookup operation, a single value from each array in the plurality of arrays that has fewer dimensions than the number of dimensions of the first array.

In some aspects, the techniques described herein relate to a system, wherein the at least one computer is configured to: perform, for each array in the plurality of arrays that has more dimensions than the number of dimensions of the first array, a forward lookup based on the first index value of the array element of the first array.

In some aspects, the techniques described herein relate to a system, wherein the forward lookup returns, to the caller of the lookup operation, values from a plurality of array elements from each array in the plurality of arrays that has more dimensions than the number of dimensions of the first array.

In some aspects, the techniques described herein relate to a non-transitory computer readable storage medium, including instructions stored thereon, which instructions, when read and executed by one or more computer processors, cause the one or more computer processors to perform steps including: providing a plurality of arrays, wherein each array of the plurality of arrays is related to a first array; receiving, by a lookup operation, a variable value, wherein the variable value is stored in the first array; determining a first index value of an array element of the first array, wherein the array element of the first array stores the variable value; determining, based on the first index value of the array element of the first array, a respective index value for each array in the plurality of arrays; and returning, to a caller of the lookup operation, a respective value stored at a corresponding array element of each respective index value for each array in the plurality of arrays.

In some aspects, the techniques described herein relate to a non-transitory computer readable storage medium, including: determining a number of dimensions of the first array where the variable value is stored.

In some aspects, the techniques described herein relate to a non-transitory computer readable storage medium, including: performing, for each array in the plurality of arrays that has fewer dimensions than the number of dimensions of the first array, a backwards lookup based on the first index value of the array element of the first array.

In some aspects, the techniques described herein relate to a non-transitory computer readable storage medium, wherein the backwards lookup returns, to the caller of the lookup operation, a single value from each array in the plurality of arrays that has fewer dimensions than the number of dimensions of the first array.

In some aspects, the techniques described herein relate to a non-transitory computer readable storage medium, including: performing, for each array in the plurality of arrays that has more dimensions than the number of dimensions of the first array, a forward lookup based on the first index value of the array element of the first array.

In some aspects, the techniques described herein relate to a non-transitory computer readable storage medium, wherein the forward lookup returns, to the caller of the lookup operation, values from a plurality of array elements from each array in the plurality of arrays that has more dimensions than the number of dimensions of the first array.

BRIEF DESCRIPTION OF THE DRAWINGS

FIG. 1 is a block diagram of an array data structure, in accordance with aspects.

DETAILED DESCRIPTION

Figure 2:
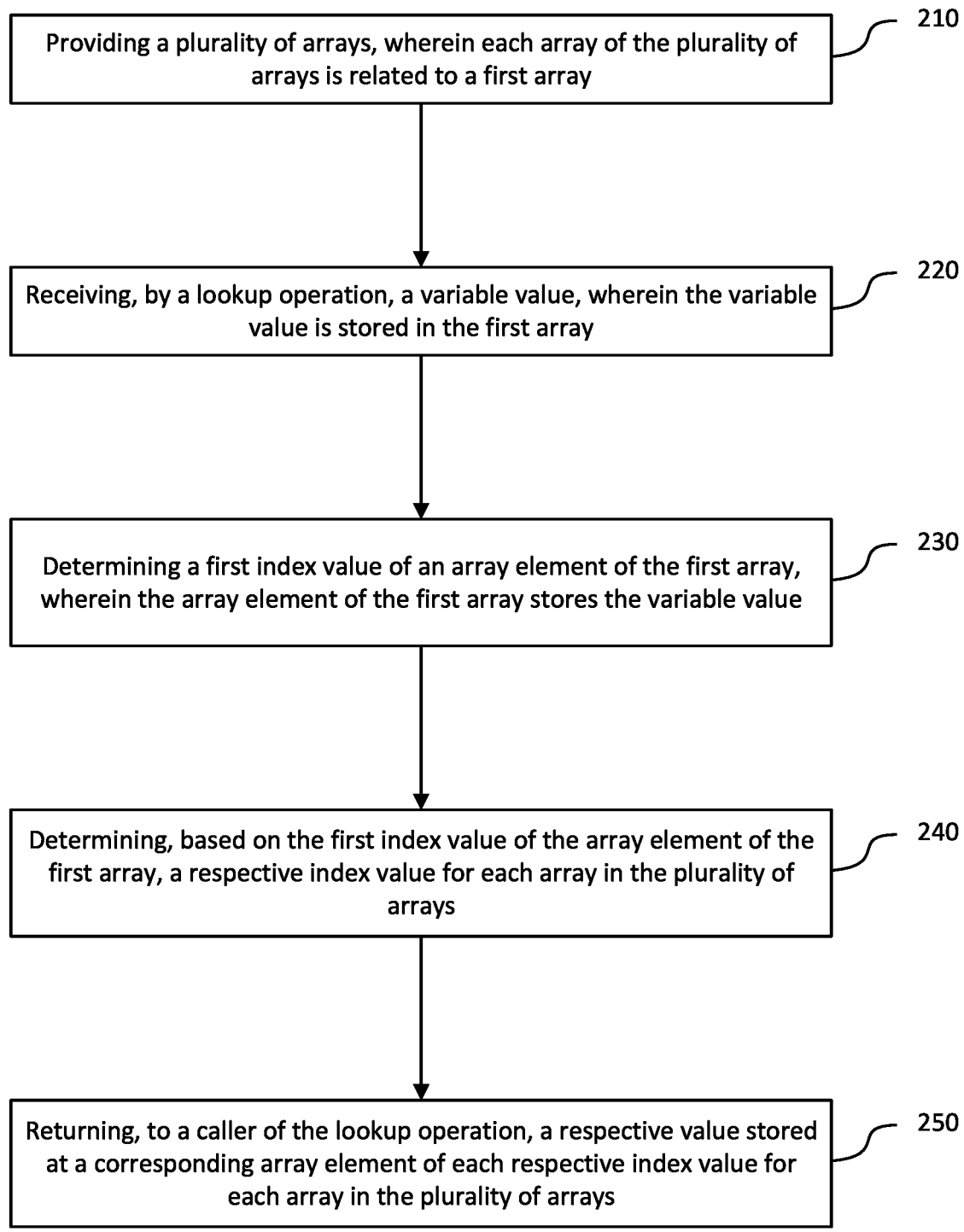
FIG. 2 is a logical flow for forward and backward lookup of related variables, in accordance with aspects.

Aspects generally relate to systems and methods for forward and backward lookup of related variables.

Aspects may perform forward and reverse lookups of related datasets based on a variable value from one of the datasets and where the datasets are stored in corresponding arrays. Based on the results of a lookup operation, aspects may return values from the related datasets.

In accordance with aspects, a first dataset, $D_1$, may have a number of unique values, $n_1$, a second dataset, $D_2$ may have a number of unique values $n_2$, a third dataset $D_3$ may have a number of unique values $n_3$, and so on, such that an $i^{th}$ dataset may have a number of unique values $n_i$. For instance, in a scenario where three datasets have values that are related or mapped to each other in some way, a first dataset $D_1$ may have 2 unique values (i.e., $n_1$=2), a second data set $D_2$ may have 5 unique values (i.e., $n_2$=5), and a third dataset $D_3$ may have 15 unique values (i.e., $n_3$=15).

In accordance with aspects, given n number of datasets, variable values $V_1, V_2 \ldots V_n$ of respective datasets (i.e., $D_1, D_2, \ldots D_n$) may be related in such a way that every variable $V_1$ has a one-to-many relationship with every variable $V_{i+1}$. For example, given 3 datasets $D_1$, $D_2$, and $D_3$, then variable value $V_1$ taken from $D_1$ will have a one-to-many relationship with variable value $V_2$ taken from $D_2$, and variable value $V_2$ taken from $D_2$ will have a one-to-many relationship with variable value $V_3$ taken from $D_3$. Such a relationship will result in a backward lookup operation that will be 1-1 (i.e., for each variable value $V_{i+1}$, there will be 1 related value $V_1$). Such a relationship will additionally result in a forward lookup operation that will be a one-to-many (i.e., for each variable value $V_1$, there will be many related values $V_{i+1}$). Accordingly, given the value of a variable $V_1$, a lookup operation may produce all values of a related variable $V_j$ where $_{j<i\leftarrow n}$ (i.e., all values of $V_j$ that $V_1$ maps to, and so on, until $V_n$).

Aspects may utilize a data structure that includes a collection (i.e., a plurality) of arrays to facilitate an efficient forward and backup lookup operation across data sets related as described herein. Each array in a collection may have a different number of dimensions. The number of arrays and the number of dimensions assigned to each array may be based on the number of data sets that will be traversed in the lookup operation. For instance, given datasets $D_1, D_2 \ldots D_n$, that will be traversed, respective arrays $A_1, A_2 \ldots A_n$ may be instantiated. A number of dimensions for an array $A_n$ that corresponds to a dataset $D_n$ may be equal to $_n$. Accordingly, given 3 datasets $D_1$, $D_2$, and $D_3$ that are related as described herein, an array $A_1$ may be instantiated, may be associated with dataset $D_1$, and may be a 1-dimensional array (since $_n$=1). Likewise, an array $A_2$ may be instantiated, may be associated with dataset $D_2$, and may be a 2-dimensional array (since $_n$=2). Finally, an array $A_3$ may be instantiated, may be associated with dataset $D_3$, and may be a 3-dimensional array (since $_n$=3).

In accordance with aspects, an array's length may be based on the number of the array's dimensions and the maximum number of values that any dimension may hold. For instance, given datasets $D_1, D_2, \ldots D_n$, related as described herein, $D_1$ may have $n_1$ number of unique values. An array $A_1$, which corresponds to $D_1$ may be a 1-dimensional array of length $n_1$, since $D_1$ may only have 1-many (one-to-many) relationships. That is, each value included in $D_1$ may relate to 2 or more values in $D_2$ ($D_1$ may also relate to 1 or more values but, notably, a 1-many relationship is possible in this direction). $D_1$ is considered a first-order dataset, in this respect. Values in $D_2$, however, may each only relate to a single value in $D_1$. An array size, then, for a 2-dimensional array $A_2$, which corresponds to $D_2$ may have a size of $(n_1) \times (m)$, where m is equal to the highest number of relationships from any value of $D_1$ to values of $D_2$. Moreover, values in $D_3$ may each only relate to a single value in $D_2$. An array size, then, for a 3-dimensional array $A_3$, which corresponds to $D_3$ may have a size of $(n_1) \times (m) \times (p)$, where p is equal to the highest number of relationships from any value of $D_2$ to values of $D_3$. This pattern may go on such that values of $D_i$ will be stored in a i-dimensional array of, e.g., $(n_1) \times (m) \times (p) \times (q)$, values of $D_{i+1}$ will be stored in a i+1-dimensional array of, e.g., $(n_1) \times (m) \times (p) \times (q) \times (q)$, and values of $D_n$ will be stored in an n-dimensional array of, e.g., $(n_1) \times (m) \times (p) \times (q) \times (q) \times (t)$.

In an exemplary aspect, the lookup operation described herein may be used in computer programming scenario's where lookup may be either forward or reverse, and that are particularly sensitive to latency. For example, user interfaces where fields are loaded with variable values based on a user selection, and where users of the interface may be particularly sensitive to latency may benefit from the techniques described herein. For instance, a user interface, such as a graphical user interface, may include drop-down style boxes. The drop-down boxes may be prepopulated with values from corresponding datasets. For instance, an interface may include three drop-down boxes and each box may be populated with values included in three respective datasets. It may be desirable for a user of the interface to be able to select a value from any box and have the remaining (i.e., the unselected) boxes populate only with data that is related to the selected value. This functionality may reduce the number of entries in other boxes and provide a more efficient interface for the user. Where the values of the datasets are related as described herein, the techniques described herein may be used to populate, either in a forward or reverse lookup manner, the remaining drop-down boxes with values that are related to the selected value from one of the drop-down boxes of the interface.

In an exemplary aspect, 3 datasets, e.g., $D_1$, $D_2$, and $D_3$, may be related as described herein. Dataset $D_1$ may store top, or first-order data. For instance, $D_1$ may store values that represent organizational units that other units belong to. In accordance with aspects, $D_1$ may have two values: U1 that represents a first organizational unit, and U2 that represents a second organizational unit. Additionally, related dataset $D_2$ may store values that represent second-tier organizational units. Each second-tier organizational unit may be organized under (i.e., belong to) either U1 or U2. Accordingly, U1 and U2 may have 1-many relationships with various values stored in $D_2$ that represent second tier units. $D_2$ may, e.g., store 5 values: 2T1, 2T2, 2T3, 2T4, and 2T5. Each of these 5 values may represent a corresponding second-tier organizational unit. Each of the 5 values of $D_2$ may have a 1-1 relationship with a first-tier organization unit of $D_1$. Moreover, dataset $D_3$ may store values that represent individual components that are organized (i.e., belong to) one of the second-tier organization units. $D_3$ may store 15 values that represent individual components. The values may be C1-C15. Each value of $D_2$ may have a 1-many relationship with various component values of $D_3$, and each component value of $D_3$ may have only a 1-1 relationship with a single second-tier organizational unit value of $D_2$.

Exemplary relations among $D_1$, $D_2$, and $D_3$ may be as follows: C1-C3 may belong to 2T1; C4-C7 may belong to 2T3; C8-C10 may belong to 2T5; C11-C12 may belong to 2T2, and C13-C15 may belong to 2T4. Moreover, 2T1, 2T3, and 2T5 may belong to U1, and 2T2 and 2T4 may belong to U2. Representative relationships may be assigned to the representative values as described herein.

FIG. 1 is a block diagram of an array data structure, in accordance with aspects. Data structure 100 includes a collection of arrays that may be used to store the exemplary values described herein. For instance, 1-dimensional array 111 may store corresponding values from a dataset $D_1$. 2-dimensional array 112 may store values from corresponding dataset $D_2$. And 3-dimensional array 113 may store values from corresponding dataset $D_3$. 1-dimensional array 111 is of a length adequate to store each value of $D_1$. Since $D_1$ has 2 values, 1-dimensional array 111 has two elements 0 and 1 (i.e., a length of two).

2-dimensional array 112 is of length $n_1$ (i.e., 2) times m (i.e., 3, since the highest number of relationships from any value of $D_1$ to values of $D_2$ is 3). That is, since U1 has a 1-3 relationship with values of $D_2$ (namely with 2T1, 2T3, and 2T5), since U2 only has a 1-2 relationship with values of $D_2$, and since 3>2, the length of 2-dimensional array 112 is set to 2×3.

3-dimensional array 113 is of length $n_1$ (i.e., 2) times m (i.e., 3) times p (i.e., 4, since the highest number of relationships from any value of $D_2$ to values of $D_3$ is 4). That is, since 2T3 has a 1-4 relationship with values of $D_3$ (namely with C4, C5, C6, and C7), and since this is the highest number of relationships that a $D_2$ value has with $D_3$ values, the length of 3-dimensional array 113 is set to 2×3×4. 3-dimensional array 113 embeds a 1-dimensional array of length 4, which includes values from dataset $D_3$ in its elements, into a 2-dimensional array having length 2×3. Accordingly, this produces the desired (n1)×(m)×(p) (i.e., 2×3×4) length.

Because array length, is (at least partially) based on a highest number of 1-many relationships, elements of some of the arrays may be left empty, null, etc. (see, for examples, element [1, 2] of 2-dimensional array 112, and elements [0, 0, 3] and [1, 0, 2] of 3-dimensional array 113). In other aspects, a placeholder value may be inserted in the elements that would otherwise not hold data from a respective dataset.

Data structure 100 further includes memory 102. Memory 102 stores—1-dimensional array 111, 2-dimensional array 112, and 3-dimensional array 113. Memory 102 may be volatile memory, such as random access memory or a high-speed cache memory, or memory 102 may be non-volatile memory such as hard disk space. In some aspects, where memory 102 is volatile memory, the array data structured may also be stored, persistently, in non-volatile memory or stored in a different format for persistent, long-term storage (e.g., such as in a relational database, a key-value pair, etc.) and instantiated in an array structure upon execution of an accessing computer program, application, application module, etc. Memory 102 is configured to be accessible by computer applications, computer programs, computer application modules (e.g., sub-programs, subroutines, packages, classes, etc.), etc., that are programmed to use the lookup operation described herein. The lookup operation may be configured as a software method that takes input arguments and returns output to the caller of the method based on the input method. Exemplary input includes a value from a relevant dataset.

In accordance with aspects, a lookup operation may perform forward lookup, backup lookup, or both forward and backward lookup, depending on which variable is given. In an exemplary scenario where a first-order variable is given (e.g., by an application or interface user), the lookup operation may perform a forward lookup operation and return the related variables from the related datasets. For instance, given the exemplary scenario described herein, and with further reference to FIG. 1, if top-level organization unit U2 is provided, the lookup operation may determine the element index of value U2 in 1-dimensional array 111 (i.e., element index 1), and return all elements of 2-dimensional array 112 at row 1, using the determined element index from 1-dimensional array 111 as a lookup parameter. Accordingly, values 2T2 and 2T4 are returned from 2-dimensional array 112. Further, the lookup operation may determine the indexes of values returned from 2-dimensional array 112 (i.e., index [1, 0], and index [1, 1], which are not null). The lookup operation may determine values at these indexes in 3-dimensional array 113 and return them (i.e., components C11, C12, C13, C14, and C15) and return these to the caller. This is an example of a forward lookup operation starting with a top-tier dataset (i.e., $D_1$).

When an input value from a mid-tier dataset is provided (i.e., a data set that has data mapped in a 1-many relationship with lower-level dataset values and in a 1-1 relationship with higher-level datasets), such as from $D_2$, the lookup operation may perform both forward and backward lookups. For instance, if the second-tier organizational unit 2T3 is given, the lookup operation may determine the index value where 2T3 is stored (i.e., [0, 1] in 2-dimensional array 112). The lookup operation may perform a backward lookup using the 0 row-parameter from the index value, since the row-parameter value gives the position of the higher-level value with which 2T3 is related. And since this traversing from lower-tier datasets to higher-tier data sets involves 1-1 relationships, the backward lookup operation halts when it reaches the top-tier, single-dimension array, in this exemplary case, 1-dimensional array 111. The lookup operation may then perform forward lookups as needed (and as described above) until the lowest-level array is reached.

When a value from a lowest level dataset is given as input, the lookup operation may perform a fully backward lookup. For instance, if the component value C6 (from $D_3$) is provided as input, the lookup operation may determine the index parameter value and work backward. In the example scenario discussed herein, C6 is at index [0, 1, 2] of 3-dimensional array 113. The lookup operation may retrieve the value at index [0, 1] of 2-dimensional array 112, and the value at index [0] of 1-dimensional array 111. Those values are 2T3 and U1, respectively.

In formulaic terms, given a variable of $V_1$, where $_i$ represents the number of dimensions of an array that $V_1$ is stored in, and given a that $V_1$=y, a lookup operation may first find the index of y in an i-dimensional array. Then, for all variable values $V_j$ preceding $V_1$ (i.e., all variable values from higher-level datasets and stored in arrays having fewer dimensions), $j<i=A_j[a_1] \ldots [a_j]$ which results into a single value. For all variable values after $V_1$ (i.e., all variable values from lower-level datasets and stored in arrays having more dimensions), $_{i<j\leftarrow n}=A_j[a_1] \ldots [a_j]$ which is array of j–i dimension. In an exemplary aspect, given a variable V1, V2, . . . Vn for respective datasets D1 (1-dim), D2 (2-dim), . . . Dn (n-dim), for any input of value $V_i$ which has an index [a1, a2, . . . ai]: The value of variables $V_j$ where $_{j<i}$ is $D_j$ [a1, a2 . . . $a_j$], which resolves to a single value for each variable. The value of variables $V_j$ where $_{j>i}$ is Dj [a1, a2 . . . $a_j$], which resolves into an array of dimension $_{j-i}$ for each variable. In the latter case the $_{j-i}$ dimension may be flattened before it is returned to the caller.

For instance, given variables V1, V2, . . . V5 and corresponding datasets D1, D2, . . . D5, For a received input value of V3 with index [0,2,1]: V1=D1[0], V2=D2[0,2], V4=D4[0, 2, 1] (a 1-dimensional array), V5=D5[0,2,1] (a 2-dimensional array).

In accordance with aspects, since the values of the variables are known and the operation uses no extra space the space requirement is O(1). Moreover, the computational requirements are either O(n) or O(log n) depending on the search direction in the initial step. If the index of the value of variable $V_i$ is known, then the operation can run in O(1) time. Accordingly, the lookup techniques described herein are ideal for latency and storage sensitive applications.

FIG. 2 is a logical flow for forward and backward lookup of related variables, in accordance with aspects.

Step 210 includes providing a plurality of arrays, wherein each array of the plurality of arrays is related to a first array.

Step 220 includes receiving, by a lookup operation, a variable value, wherein the variable value is stored in the first array.

Step 230 includes determining a first index value of an array element of the first array, wherein the array element of the first array stores the variable value.

Step 240 includes determining, based on the first index value of the array element of the first array, a respective index value for each array in the plurality of arrays.

Step 250 includes returning, to a caller of the lookup operation, a respective value stored at a corresponding array element of each respective index value for each array in the plurality of arrays.

Figure 3:
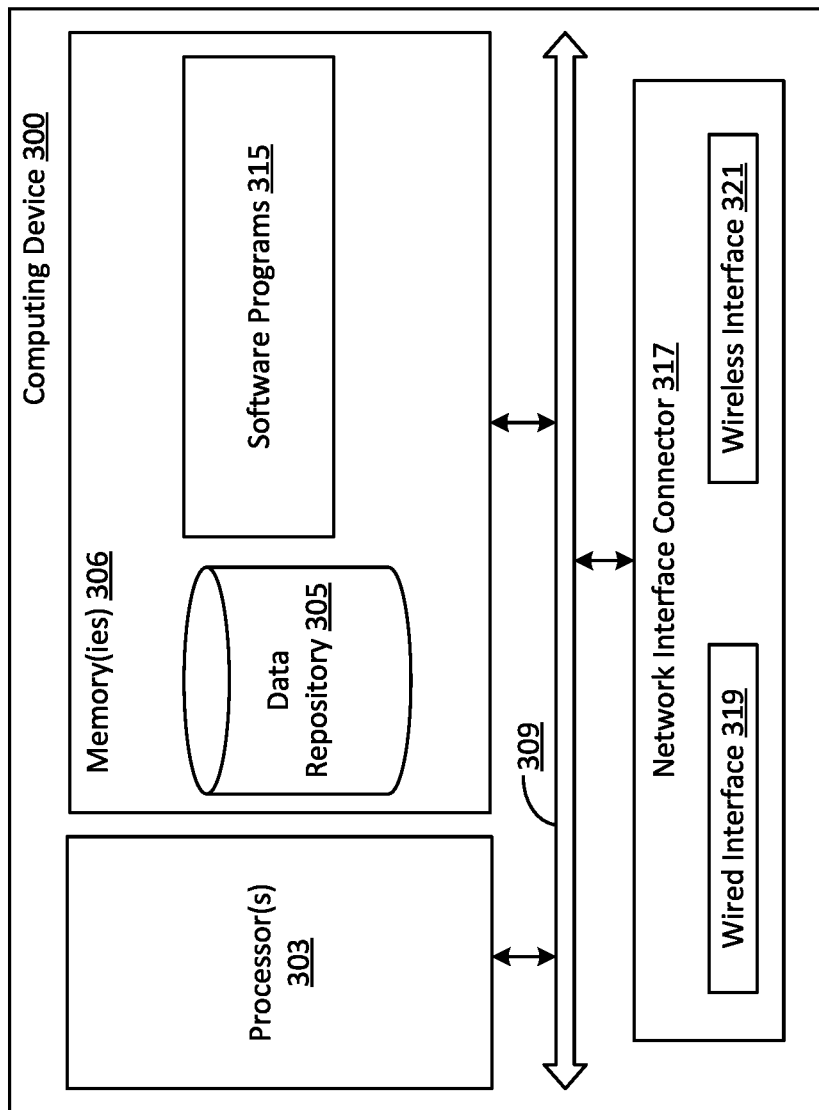
FIG. 3 is a block diagram of a computing device for implementing certain aspects of the present disclosure.

FIG. 3 is a block diagram of a computing device for implementing certain aspects of the present disclosure. FIG. 3 depicts exemplary computing device 300. Computing device 300 may represent hardware that executes the logic that drives the various system components described herein. For example, components described herein such an array data structure, variable lookup logic, calling software applications, programs, modules, etc., an interface, various database engines and database servers, and other computer applications and logic may include, and/or execute on, components and configurations like, or similar to, computing device 300.

Computing device 300 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 300 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing machine" a "computing device," an "electronic device," a "mobile device," etc. These may be a computer, a computer server, a host machine, etc. As used herein, the term "processing machine," "computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized herein as an application, computer application, program, software program, or simply software. In one aspect, the processing machine may be or include a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

The processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:
   providing a plurality of arrays, wherein each array of the plurality of arrays is related to a first array;
   receiving, by a lookup operation, a variable value, wherein the variable value is stored in the first array;
   determining a first index value of an array element of the first array, wherein the array element of the first array stores the variable value;
   determining, based on the first index value of the array element of the first array, a respective index value for each array in the plurality of arrays; and
   returning, to a caller of the lookup operation, a respective value stored at a corresponding array element of each respective index value for each array in the plurality of arrays.

2. The method of claim 1, wherein each array in the plurality of arrays has a different number of dimensions.

3. The method of claim 2, comprising:
   determining a number of dimensions of the first array where the variable value is stored.

4. The method of claim 3, comprising:
   performing, for each array in the plurality of arrays that has fewer dimensions than the number of dimensions of the first array, a backwards lookup based on the first index value of the array element of the first array.

5. The method of claim 4, wherein the backwards lookup returns, to the caller of the lookup operation, a single value from each array in the plurality of arrays that has fewer dimensions than the number of dimensions of the first array.

6. The method of claim 3, comprising:
   performing, for each array in the plurality of arrays that has more dimensions than the number of dimensions of the first array, a forward lookup based on the first index value of the array element of the first array.

7. The method of claim 6, wherein the forward lookup returns, to the caller of the lookup operation, values from a plurality of array elements from each array in the plurality of arrays that has more dimensions than the number of dimensions of the first array.

8. A system comprising at least one computer including a processor and a memory, wherein the at least one computer is configured to:
   provide a plurality of arrays in the memory, wherein each array of the plurality of arrays is related to a first array;
   receive, by a lookup operation, a variable value, wherein the variable value is stored in the first array;
   determine a first index value of an array element of the first array, wherein the array element of the first array stores the variable value;
   determine, based on the first index value of the array element of the first array, a respective index value for each array in the plurality of arrays; and
   return, to a caller of the lookup operation, a respective value stored at a corresponding array element of each respective index value for each array in the plurality of arrays.

9. The system of claim 8, wherein each array in the plurality of arrays has a different number of dimensions.

10. The system of claim 9, wherein the at least one computer is configured to:
    determine a number of dimensions of the first array where the variable value is stored.

11. The system of claim 10, wherein the at least one computer is configured to:
    perform, for each array in the plurality of arrays that has fewer dimensions than the number of dimensions of the first array, a backwards lookup based on the first index value of the array element of the first array.

12. The system of claim 11, wherein the backwards lookup returns, to the caller of the lookup operation, a single value from each array in the plurality of arrays that has fewer dimensions than the number of dimensions of the first array.

13. The system of claim 10, wherein the at least one computer is configured to:
    perform, for each array in the plurality of arrays that has more dimensions than the number of dimensions of the first array, a forward lookup based on the first index value of the array element of the first array.

14. The system of claim 13, wherein the forward lookup returns, to the caller of the lookup operation, values from a plurality of array elements from each array in the plurality of arrays that has more dimensions than the number of dimensions of the first array.

15. A non-transitory computer readable storage medium, including instructions stored thereon, which instructions, when read and executed by one or more computer processors, cause the one or more computer processors to perform steps comprising:
    providing a plurality of arrays, wherein each array of the plurality of arrays is related to a first array;
    receiving, by a lookup operation, a variable value, wherein the variable value is stored in the first array;
    determining a first index value of an array element of the first array, wherein the array element of the first array stores the variable value;
    determining, based on the first index value of the array element of the first array, a respective index value for each array in the plurality of arrays; and
    returning, to a caller of the lookup operation, a respective value stored at a corresponding array element of each respective index value for each array in the plurality of arrays.

16. The non-transitory computer readable storage medium of claim 15, comprising:
    determining a number of dimensions of the first array where the variable value is stored.

17. The non-transitory computer readable storage medium of claim 16, comprising:
    performing, for each array in the plurality of arrays that has fewer dimensions than the number of dimensions of the first array, a backwards lookup based on the first index value of the array element of the first array.

18. The non-transitory computer readable storage medium of claim 17, wherein the backwards lookup returns, to the caller of the lookup operation, a single value from each array in the plurality of arrays that has fewer dimensions than the number of dimensions of the first array.

19. The non-transitory computer readable storage medium of claim 16, comprising:
    performing, for each array in the plurality of arrays that has more dimensions than the number of dimensions of the first array, a forward lookup based on the first index value of the array element of the first array.

20. The non-transitory computer readable storage medium of claim 19, wherein the forward lookup returns, to the caller of the lookup operation, values from a plurality of array elements from each array in the plurality of arrays that has more dimensions than the number of dimensions of the first array.

* * * * *